Nov. 1, 1949　　　　　M. S. ALTMAN ET AL　　　　2,486,906
TOASTER
Filed Oct. 1, 1945　　　　　　　　　　　3 Sheets-Sheet 3

INVENTOR
MAX S. ALTMAN
FRED A. PETTIS
BY Bean Brooks, Buckley & Bean
ATTORNEYS

Patented Nov. 1, 1949

2,486,906

UNITED STATES PATENT OFFICE 2,486,906

TOASTER

Max S. Altman and Fred A. Pettis, Buffalo, N. Y.; said Pettis assignor to said Altman Application October 1, 1945, Serial No. 619,518

2 Claims. (Cl. 99—395)

This invention relates to domestic cooking appliances and particularly to an improved electrical toaster.

One well known form of electrical toaster comprises a casing having doors hinged at their lower edges to the opposite sides of the casing and wherein opening movement of the door permits a slice of bread held thereby to slide downwardly onto the inner face of the door in such manner that subsequent reclosure of the door completes a reversal of the initial position of the slice.

The toaster of the present invention is of this general class and so constructed and arranged that slices of bread or similar material may be simultaneously reversed at opposite sides of the toaster by a single manual motion which may be accomplished with one finger if desired.

The construction of the toaster of the present invention presents numerous other advantages in manufacture and construction and in practical usefulness and maintenance. The principles underlying the present invention are embodied in the illustrative toaster shown in the accompanying drawings and described in detail in the following specification. However, it is to be understood that the present invention is not limited to the form shown by way of example, or otherwise than as defined in the appended claims.

Figure 1:
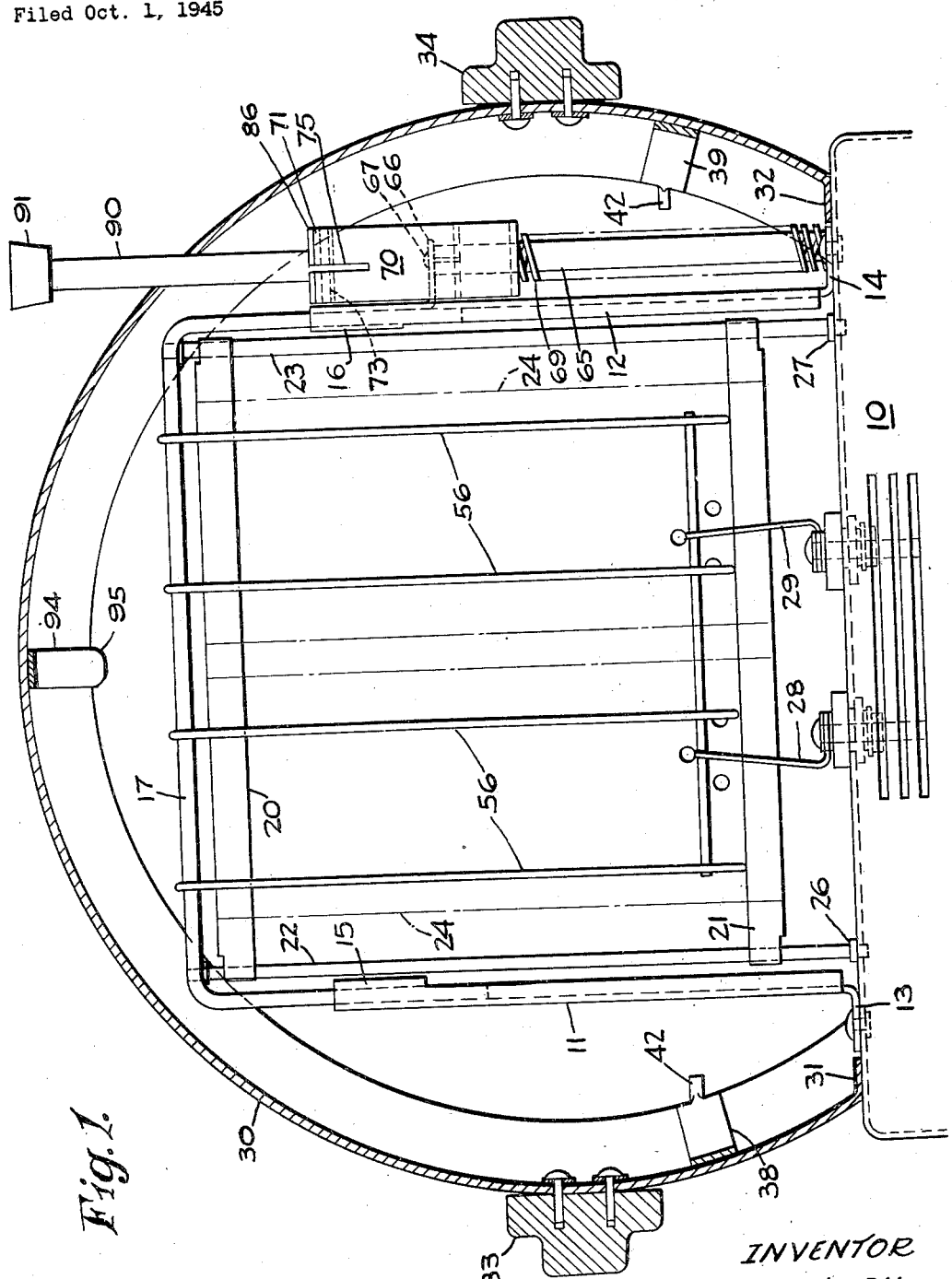
Fig. 1 is a side elevational view of one form of the toaster of the present invention with the casing thereof shown in cross section.

In the drawings like characters of reference denote like parts and reference will first be had to the general interior framework of the toaster. The numeral 10 designates a base element which, in the present instance, is merely an inverted pan, but may assume any desired form. The general support for the interior framework of the toaster comprises a pair of upright channel elements 11 and 12 which have angularly extending feet 13 and 14, respectively, at their lower ends for securement to the upper surface of the base element 10 in any desired manner. At their upper ends the channels 11 and 12 have inturned flanges 15 and 16, respectively, which provide sockets for receiving the opposite ends of a inverted U-shaped strap element 17.

The support for the heating elements proper comprises upper and lower horizontal rails 20 and 21 of any desired material which are fixed in desired relationship with respect to each other by means of a pair of vertical rods 22 and 23, which pass through opposite ends of the rails 20 and 21. The rails 20 and 21 may be fixed against movement along rods 22 and 23 in any desired manner. The resistance elements proper may be wound about mica sheets or the like in an entirely conventional manner and such sheets are fixed to the rails 20 and 21 in any desired manner conventional in the art and are merely indicated schematically in dot-and-dash lines at 24 in Fig. 1.

In assembling the structure thus far set forth, assuming the upright channels 11 and 12 to be in fixed assembled position on base 10, the lower ends of rods 22 and 23 are inserted in openings formed in the upper surface of base 10 and their downward movement in such openings is limited by enlargements 26 and 27 formed near lower ends of rods 22 and 23. The strap member 17 is then merely pressed downwardly so that its opposite depending ends enter the sockets provided at the upper ends of the channels 11 and 12 until the upper ends of rods 22 and 23 enter registering openings formed in the horizontal portion of strap 17. This completes a relatively simple and sturdy assembly of the heating means proper. Suitable electrical conductors to the resistance elements are designated 28 and 29 in Fig. 1.

Figure 2:
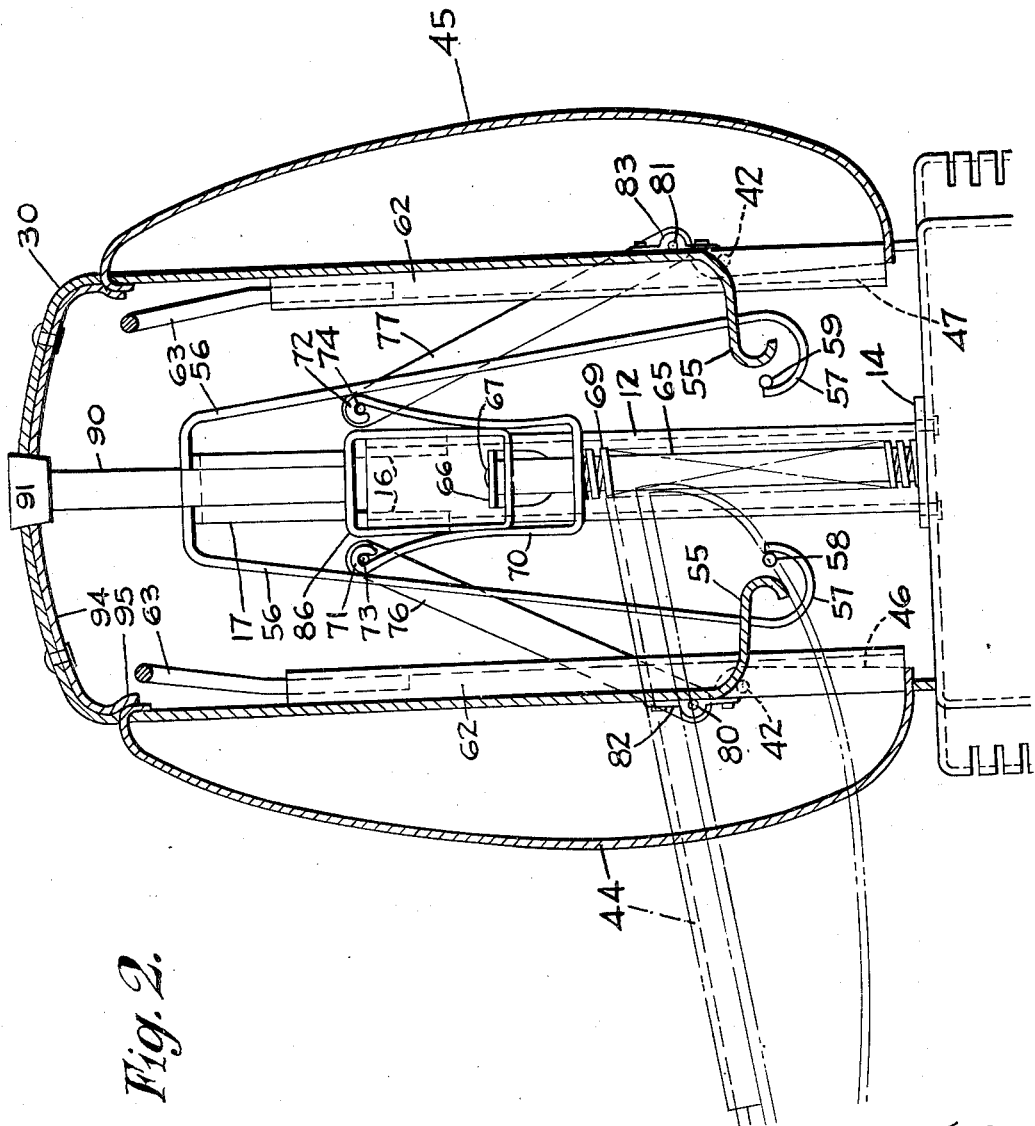
Fig. 2 is an end elevational view, likewise with the casing shown in cross section.

A main casing member is designated 30 in Figs. 1 and 2 and comprises a circularly extending wall which terminates at its opposite lower ends in inturned flanges 31 and 32 which may be secured to base 10 in any convenient or desired manner. Suitable handles 33 and 34 may be secured to the casing 30 by means of rivets, screws or other fastening devices.

Casing 30 is provided at its lower interior opposite sides with straps 38 and 39 which are secured to the casing, extend thereacross, and terminate at their opposite ends in pintles 42 which may be swaged from bars 38 and 39 or formed in any other desired manner.

It will be noted from Fig. 1 that the two pintles 42 there illustrated are co-axial and thus provide pivotal support for door elements not shown in Fig. 1 but designated 44 and 45 in Fig. 2. In the form illustrated, the door elements comprise generally convex or crowned stampings which are dished sufficiently to provide lower marginal flanges 46 and 47, respectively, at opposite sides of each of the door elements. The flanges 46 and 47 are perforated to receive pintles 42 as appears from Fig. 2 and the doors may be assembled in position by merely springing the flanges 46 of door 44 and the flanges 47 of the door 45 toward each other sufficiently to fit between the pintles.

Figure 3:
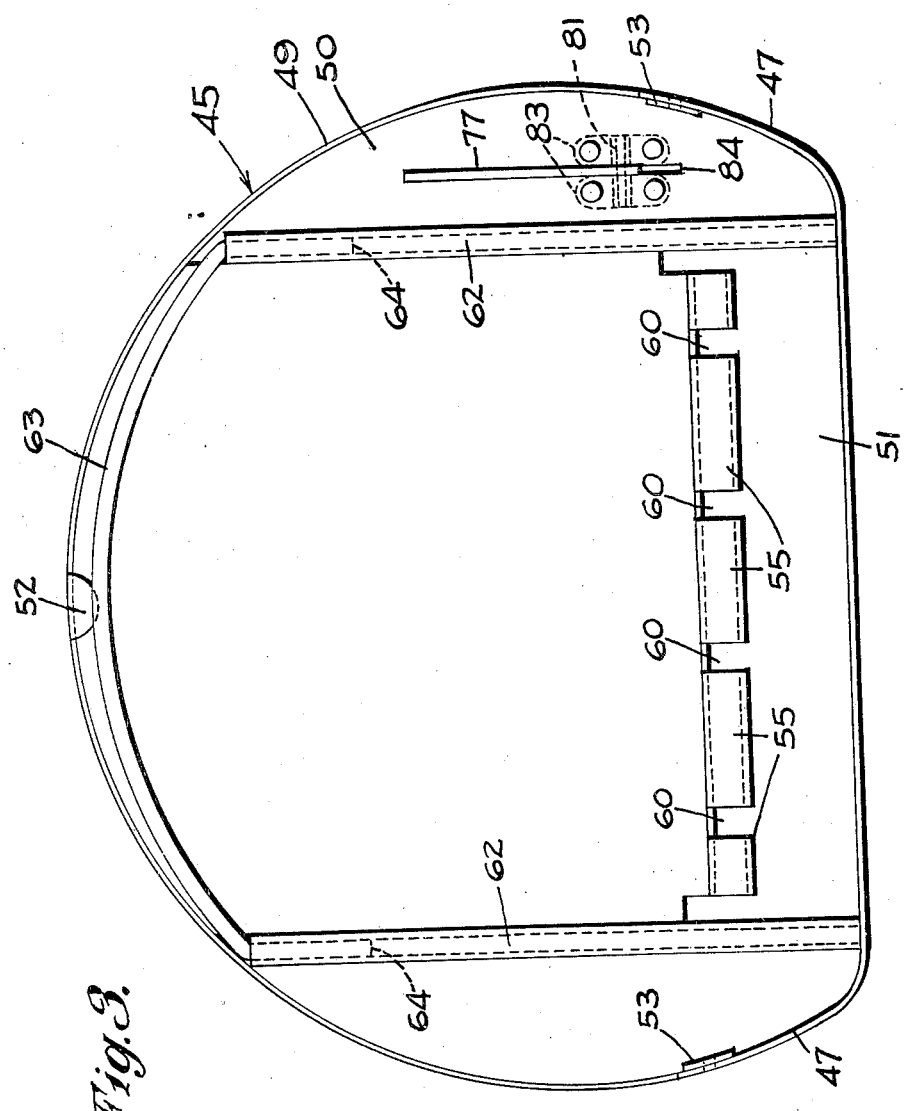
Fig. 3 is an elevational view of one of the door elements looking at its interior surface.

Reference will now be had to Fig. 3 which is an interior elevational view of door 45. As appears from Figs. 2 and 3, door 45 comprises a convex outer wall element 49 and a relatively flat lining sheet 50 which fits within the marginal flange of element 49 entirely thereabout excepting at the lower portion indicated at 51 in Fig. 3. Lining sheet 50 is held within the opening formed by the margins of convex outer wall element 49 by a tab 52 formed at the upper edge of element 49 and by the provision of a pair of ears 53 formed at opposite sides of lining sheet 50 in registry with perforations in the flanges 47 of element 49 which receive the pintles 42. In assembled position, the pintles 42 extend through perforations in both the flanges 47 of element 49 and the ears 53 of lining sheet 50, thus completing the assembly of element 49 and lining sheet 50.

Lining sheet 50 is cut away as previously indicated at 51 and the central portion of its lower edge is of curved form as indicated at 55 in Fig. 2. The strap 17 of the toaster frame has a plurality of inverted U-shaped rods 56 fixed thereto and rods 56 depend as shown in Fig. 2 and are inwardly bent at their lower ends as indicated at 57. The end portion of the several rods 56 are joined by a pair of horizontal rods 58 and 59, fixed thereto by welding or the like.

The formation 55 of lining plate 50 is notched as at 60 to clear the rods 56 when the doors are in the closed position illustrated in Fig. 2. In such position slices to be toasted lean against the rods 56 and are supported at their lower edges by the formations 55. The formations 55 are such that upon opening movement of the doors the lower edges of the slices are cammed away from the rods 56 and the slices slide down upon the door linings 50 in such fashion that their toasted sides are downward when the doors are in the fully opened position indicated fragmentarily in dot-and-dash lines in Fig. 2. Subsequent reclosure of doors 44 and 45 presents the untoasted sides of the slices toward bars 56 to be toasted.

Lining sheets 50 have spaced vertical channel formations 62 which reinforce the plate and define a bread receiving space thereon. A bail element 63 has its opposite ends 64 secured in the upper ends of channel formations 62 and the medial portion of bail elements 63 is spaced from lining sheet 50 and forms a stop to limit sliding movement of a slice on lining sheet 50 as a door is opened.

The manual means for simultaneously lowering the doors 44 and 45 to revesre the positions of the slices supported thereby will now be described. A spring post 65 has one end secured in an opening formed in the lower flange 16 of channel 12. The upper end of post 65 is secured to a flange 66 which may be struck from the web of channel 12 as shown in Figs. 1 and 2, and securement of post 65 in a fixed relative position may be completed by a screw 67 which passes through flange 66 and threads into the upper end of post 65.

A compression coil spring 69 surrounds post 65 and engages at its lower end against flange 16 of channel 12. Its upper end is acted against by the lower surface of a U-shaped member 70 whose upper ends are curled as at 71 and 72 to provide bearings for hinge pins 73 and 74. The upper ends of U-shaped member 70 are slotted as at 75 in Fig. 1 to receive links 76 and 77 which are pivoted at their upper ends to hinge pins 73 and 74, respectively. The lower ends of links 76 and 77 are pivotally attached to the doors 44 and 45 by means of pivot pins 80 and 81, respectively, which may be retained in position by bearings 82 and 83 secured to the inner faces of the door lining sheets 50. The lining sheets 50 are suitably slotted to receive links 76 and 77 as indicated at 84 in Fig. 3.

A member 86, comprising a rectangular frame, which may be bent from a single strip of metal or the like, fits within the opposite sides of the U-shaped element 70 and may be spot-welded or otherwise secured thereto. The upper end of frame element 86 has fixed thereto in any desired manner a post 90 which extends upwardly through a suitable opening in the main casing 30 and is provided with a manipulating knob 91. It will be noted that the lower end of U-shaped element 70 and the lower side of rectangular frame member 86 give spaced slide bearing support to this portion of the assembly for movement up and down on spring post 65.

It will be seen from the foregoing that the doors are normally retained in closed vertical position by action of the spring 69 against the bottom of U-shaped member 70, which tends to urge the links 76 and 77 upwardly and accordingly tends to urge the door 44 in a clockwise direction about its pivot 42, and the door 45 in a counterclockwise direction about its pivot 42. A transverse strap 94 is secured centrally within casing 30 and has stop portions 95 formed at its opposite ends for defining the closed position of doors 44 and 45. When it is desired to move the doors to their open position, which is illustrated by way of example in the dot-and-dash showing of door 44 in Fig. 2, it is merely necessary to press straight downwardly upon knob 91 to move the U-shaped element 70 downwardly against the resistance of spring 69, and thus pivot both doors to open position, which automatically reverses the bread slices. Mere release of pressure from the knob 91 permits spring 69 to automatically swing both doors to closed position and complete the reversal of the position of the slices. A mere duplication of the foregoing operation is required to present the slices for ultimate removal from the device.

Devices of this character are of relatively light construction and are quite hot and accordingly dangerous to come in contact with during use. It will be noted that the foregoing manual operation comprises a straight downward push which does nothing more than urge the appliance into firmer contact with its supporting surface. This is of significant value in a device of the class here under consideration since the manipulation of rotating knobs and other devices previously proposed can and frequently does result in displacement of the device, which might on occasion amount to an actual tipping over thereof.

What is claimed is:

1. In a toaster of the class comprising a base, a vertically extending frame secured thereto and resistance heating elements supported by said frame, a casing comprising top and end wall portions secured to said base independently of said frame, a pair of doors at opposite sides of said casing and hinged thereto along their lower portions to open outwardly and downwardly, a vertical post adjacent said frame member having its lower end fixed relative to said base and its upper end fixed relative to said frame, a compression coil spring surrounding said post and having its lower end relatively fixed, an operating member mounted for axial sliding movement on said post and bearing against the upper end of said spring, means extending through said casing from said operating member for manual depressing movement to lower said operating member against the resistance of said spring, means extending from said operating member to each door and pivotally engaging the door eccentrically of its hinge axis to open the doors simultaneously upon lowering movement of the operating member.

2. In a toaster of the class comprising a base, a vertically extending frame secured thereto and resistance heating elements supported by said frame, a casing comprising top and end wall portions secured to said base independently of said frame, a pair of doors at opposite sides of said casing and hinged thereto along their lower portions to open outwardly and downwardly, a vertical post adjacent said frame member having its lower end fixed relative to said base and its upper end fixed relative to said frame, a compression coil spring surrounding said post and having its lower end relatively fixed, an operating member mounted for axial sliding movement on said post and bearing against the upper end of said spring, means extending through said casing from said operating member for manual depressing movement to lower said operating member against the resistance of said spring, and a pair of links pivoted to said operating member, one extending to each door and pivotally engaging the door eccentrically of its hinge axis to open the doors simultaneously upon lowering movement of the operating member.

MAX S. ALTMAN.
FRED A. PETTIS.

REFERENCES CITED

The following references are of record in the file of this patent:

UNITED STATES PATENTS

| Number | Name | Date |
|---|---|---|
| 750,072 | Anderson | Jan. 19, 1904 |
| 1,639,385 | Reichold | Aug. 16, 1927 |
| 1,826,475 | Kuhn | Oct. 6, 1931 |
| 2,266,324 | Knapp | Dec. 16, 1941 |